(12) United States Patent
Marwah et al.

(10) Patent No.: US 11,269,829 B2
(45) Date of Patent: Mar. 8, 2022

(54) ROW LEVEL LOCKING FOR COLUMNAR DATA

(71) Applicant: Oracle International Corporation, Redwood Shores, CA (US)

(72) Inventors: Vineet Marwah, San Ramon, CA (US); Teck Hua Lee, Belmont, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1131 days.

(21) Appl. No.: 13/797,128

(22) Filed: Mar. 12, 2013

(65) Prior Publication Data

US 2014/0279960 A1 Sep. 18, 2014

(51) Int. Cl.
G06F 16/30 (2019.01)
G06F 16/22 (2019.01)

(52) U.S. Cl.
CPC .................. *G06F 16/221* (2019.01)

(58) Field of Classification Search
CPC .................................. G06F 16/221
USPC ...................................... 707/693
See application file for complete search history.

(56) References Cited

U.S. PATENT DOCUMENTS

| | | | | |
|---|---|---|---|---|
| 5,832,484 | A * | 11/1998 | Sankaran | G06F 17/30362 |
| 6,223,200 | B1 * | 4/2001 | Barnes | G06F 9/524 |
| | | | | 707/E17.007 |
| 6,556,994 | B1 * | 4/2003 | Zheng | G06F 17/30362 |
| 7,031,994 | B2 | 4/2006 | Lao et al. | |
| 7,496,589 | B1 | 2/2009 | Jain et al. | |
| 8,832,142 | B2 | 9/2014 | Marwah et al. | |
| 2002/0133507 | A1 * | 9/2002 | Holenstein | G06F 11/2064 |
| 2004/0177099 | A1 * | 9/2004 | Ganesh | G06F 11/1471 |
| 2004/0199512 | A1 * | 10/2004 | Cornwell | G06F 17/30362 |
| 2004/0205066 | A1 * | 10/2004 | Bhattacharjee | G06F 17/30362 |
| 2005/0289188 | A1 * | 12/2005 | Nettleton | G06F 17/30008 |
| 2011/0295817 | A1 * | 12/2011 | Chandrasekar | H03M 7/30 |
| | | | | 707/693 |
| 2012/0296883 | A1 * | 11/2012 | Ganesh et al. | 707/693 |

OTHER PUBLICATIONS

Ailamaki, Anastassia, et al., "Weaving Relations for Cache Performance," Proceedings of the 27th International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

* cited by examiner

*Primary Examiner* — Mahesh H Dwivedi
(74) *Attorney, Agent, or Firm* — Hickman Becker Bingham Ledesma LLP

(57) ABSTRACT

Row locking is performed at the row level of granularity for database data stored in columnar form. Row level locking entails use of a lock vector that is stored in a compression unit in a data block, the compression unit storing rows in columnar-major format. On an as needed basis, the lock vector is expanded to identify more transactions affecting the rows in the compression unit.

18 Claims, 8 Drawing Sheets

FIG. 1B

ROW LEVEL LOCKING FOR COLUMNAR DATA

FIELD OF THE INVENTION

The present application is related to database systems, and in particular, storing database data for efficient access.

BACKGROUND

Computers are used to store and manage many types of data. Relational and object-relational databases that are managed by database servers for database clients are an important form of storing and managing data. How database data is physically stored can have a significant effect on (1) how much storage space the database consumes, and (2) how efficiently the database data can be accessed and manipulated.

Data in a database is stored persistently in persistent storage units referred to herein as a data block. There are several forms of storing rows in data blocks, which are referred to as major formats. Major formats include row-major and column-major. In row-major format, column values of a single row are stored contiguously within a unit of persistent storage referred to herein as a data block. In column-major format, values of a column of multiple rows are stored contiguously.

Another major format is referred to herein as hybrid columnar format. In hybrid columnar format, a set of rows is stored in a unit of data referred to herein as a compression unit. Within the compression unit, columns of a row in a compression unit are stored in column-major format. Thus, a compression unit may store a subset of columns of a set of rows in column-major format.

As compared to row-major format, hybrid columnar format has the advantage of permitting greater compressibility. Also, filtering operations based on column predicate conditions are performed more efficiently. A disadvantage of hybrid-columnar format is the greater overhead incurred to change column values.

BRIEF DESCRIPTION OF THE DRAWINGS

In the drawings:

FIG. 1B is a diagram depicting a compression unit according to an embodiment of the present invention.

DETAILED DESCRIPTION

Figure 1A:
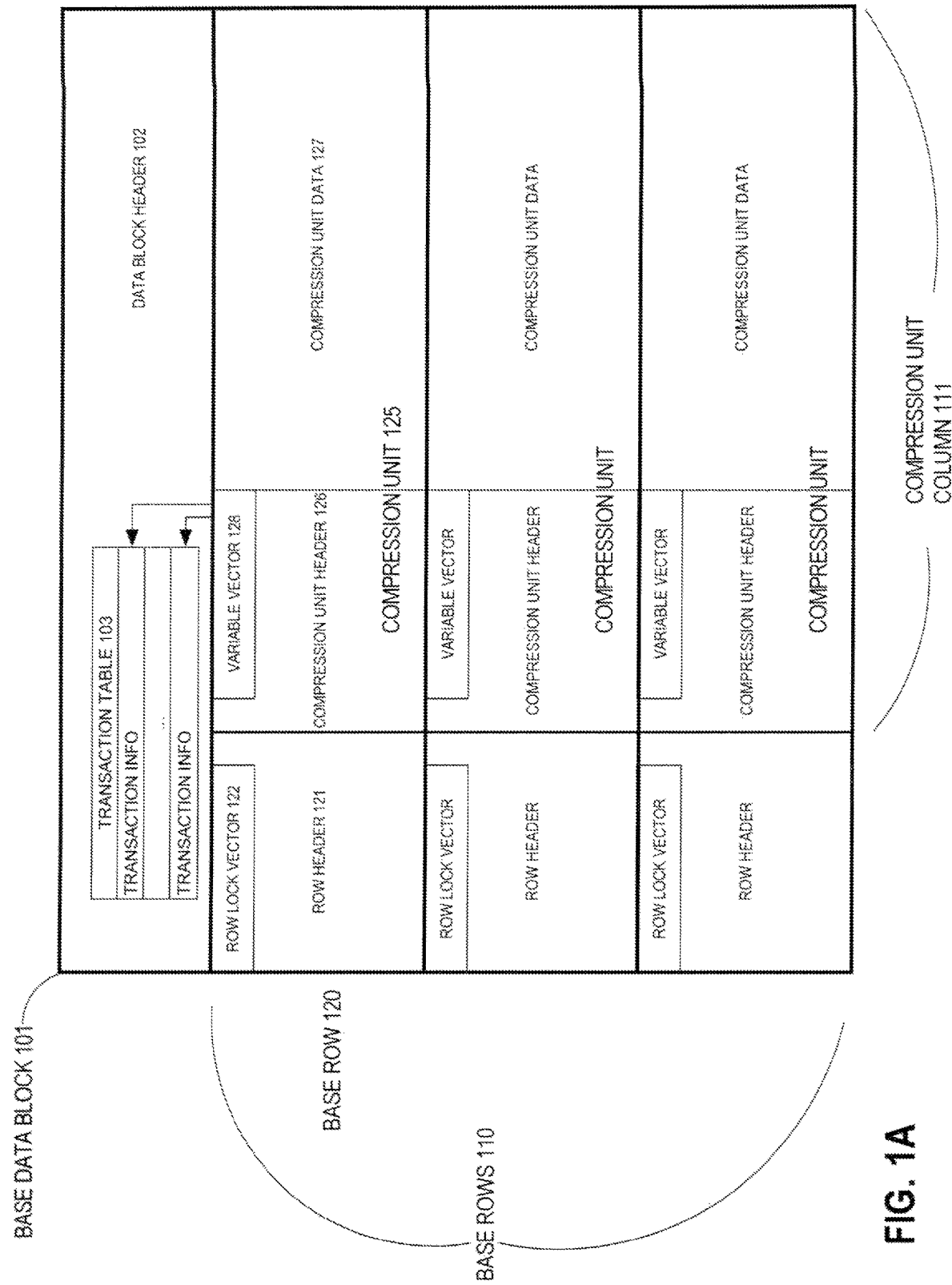
FIG. 1A is a diagram depicting a base data block containing a compression unit according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Changes to columnar data can be performed more efficiently by providing row-level locking on columnar data. Described herein are techniques to provide row-level locking for rows stored in a columnar-major format, including hybrid-columnar format. Under row-level locking, row locking is performed at the row level of granularity. An individual row may be locked in a compression unit without locking any other row in the compression unit. Without row-level locking, a row may be locked but only at a higher level of granularity that covers not only the row but other rows. Locking at a higher level of granularity leads to greater lock contention for the rows, which may delay performing database operations on the rows.

For example, a compression unit may contain 32 k of rows. A first transaction changes a first row in the compression unit. To effect the change, the first transaction obtains a lock on the row by locking the entire compression unit, thereby locking all 32 k of rows. Another transaction may change another row in the compression unit, and requests a lock on the compression unit to effect the change. However, the other transaction is blocked from obtaining the lock and effecting the change because the other transaction may not obtain a lock while the first transaction owns its lock on the compression unit. In this manner, the other transaction incurs delay to effect the change because of lock contention.

On the other hand, under row-level locking, the first transaction may obtain a lock only on the first row. The other transaction, which requires a lock on the other row, is not blocked by the lock on the first row, and is not subject to lock contention for the other row.

According to an embodiment, row level locking entails use of a lock vector that is stored in a compression unit. For each row in the compression unit, the lock vector identifies a transaction that holds a lock on the row, if any. Each row in the compression unit corresponds to a separate sequence of one or more bits within the lock vector, which is referred to herein as the row lock subvector with respect to each row.

A row lock subvector may contain one or more bits. According to an embodiment, distinct combinations of bit values represented by a row lock subvector are each an index that corresponds to an entry in a transaction list. Each entry in the transaction list contains more data identifying a specific transaction in a database system.

The size of a row lock subvector determines the number transactions that can be identified by the row lock subvector, the number of transactions that can concurrently lock different rows in a compression unit, and ultimately, the level of transaction concurrency in a database system. Thus, greater transaction concurrency can be achieved by use of larger lock vectors with larger row lock subvectors. However, higher storage overhead is incurred to store larger lock vectors with larger row lock subvectors.

The overhead is particularly wasted for rows that are "inactive" in the database. Inactive rows are rows subject to a lesser level of accesses in a database as compared to "active" rows, which are subject to a higher level of accesses. It is desirable to store the inactive rows in compression units having smaller lock vectors with smaller row lock subvectors or even no lock vectors to further reduce storage costs.

Even inactive data is changed from time to time by a transaction. A relatively low level of change activity can be adequately supported with a low level of transaction concurrency and a level of lock granularity higher than a row level. However, there may be intermittent periods of time when the level of activity is high, and the ability to temporarily and adequately support a higher level of transaction concurrency is desirable. According to an embodiment of the present invention, the size of a compression unit's lock vector and its constituent row lock subvectors is increased on an as needed basis to support greater transaction concurrency. When it is detected or otherwise determined that a larger number transactions affect rows in a compression unit than can be represented by a compression unit's lock vector, the lock vector is expanded by one or more bits in each row lock subvector in the lock vector. Lock vectors that are expanded in this way are referred to herein as variable lock vectors.

Exemplary Database System

Embodiments of the present invention are implemented in the context of a database system. A database system includes at least one database server that manages a database. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that are stored on a persistent or volatile memory mechanism, such as a set of hard disks. Database metadata defines database objects, such as tables and columns therein, object tables, views, or complex types, such as object types, and functions.

Application clients interact with a database server to access data in the database managed by the database server. Clients access the database data by submitting to the database server commands that cause the database server to perform operations on data stored in a database. A database command may be in the form of a database statement that conforms to a database language, such as the Structured Query Language (SQL). There are many different versions of SQL, some versions are standard, and some proprietary, and there are a variety of extensions. Data manipulation language ("DML") statements are issued to a database server to query or request changes to a database. Data definition language ("DDL") instructions are issued to a database server to create or configure database objects, such as tables, views, or complex data types, or to control how DML statements are to be processed.

According to an embodiment, an application client issues database commands via a database session. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session.

Typically, changes to a database of a database system are made using transaction processing. A transaction is a set of operations that change database data. In database systems, the operations are specified by one or more database commands. Committing a transaction refers to making the changes for a transaction permanent. Under transaction processing, all the changes for a transaction are made atomically.

Once a transaction is initiated, a transaction is either committed or abort. When a transaction is committed, all changes in the transaction are made permanent. When aborted, the transaction changes are rolled back. A terminated transaction is a transaction for which the operation of committing or aborting has been completed. Completing the operation of committing a transaction or aborting a transaction may include releasing locks on database objects held by the transaction, database objects such as rows.

Data Blocks

A data block is a unit of persistent storage and is used by a database server to store one or row more database rows, or portions of rows, including one or more columns of a row. When rows are read from persistent storage, a data block containing the row is copied into a data block buffer in volatile and/or main memory of a database server. A data block usually contains multiple rows, and data block metadata describing the contents of the data block. Metadata includes control and formatting information, such as offsets to sequences of bytes representing rows or other data structures, and a list of transactions affecting a row.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Base Data Blocks for Storing Compression Units

According to an embodiment of the present invention, a data block stores one or more compression units, each compression unit being stored in a column of a row in the data block. A data block that stores a compression unit in this manner is referred to herein as a base data block with respect to the compression unit. Base data blocks have a structure similar to data blocks used to store rows in row-major format. Using such base data blocks preserves backward compatibility with database systems storing data in row-major format and leverages existing functionality in the database systems. The compression units may thus co-exist within a database that also stores data in row-major format.

Figure 1B:
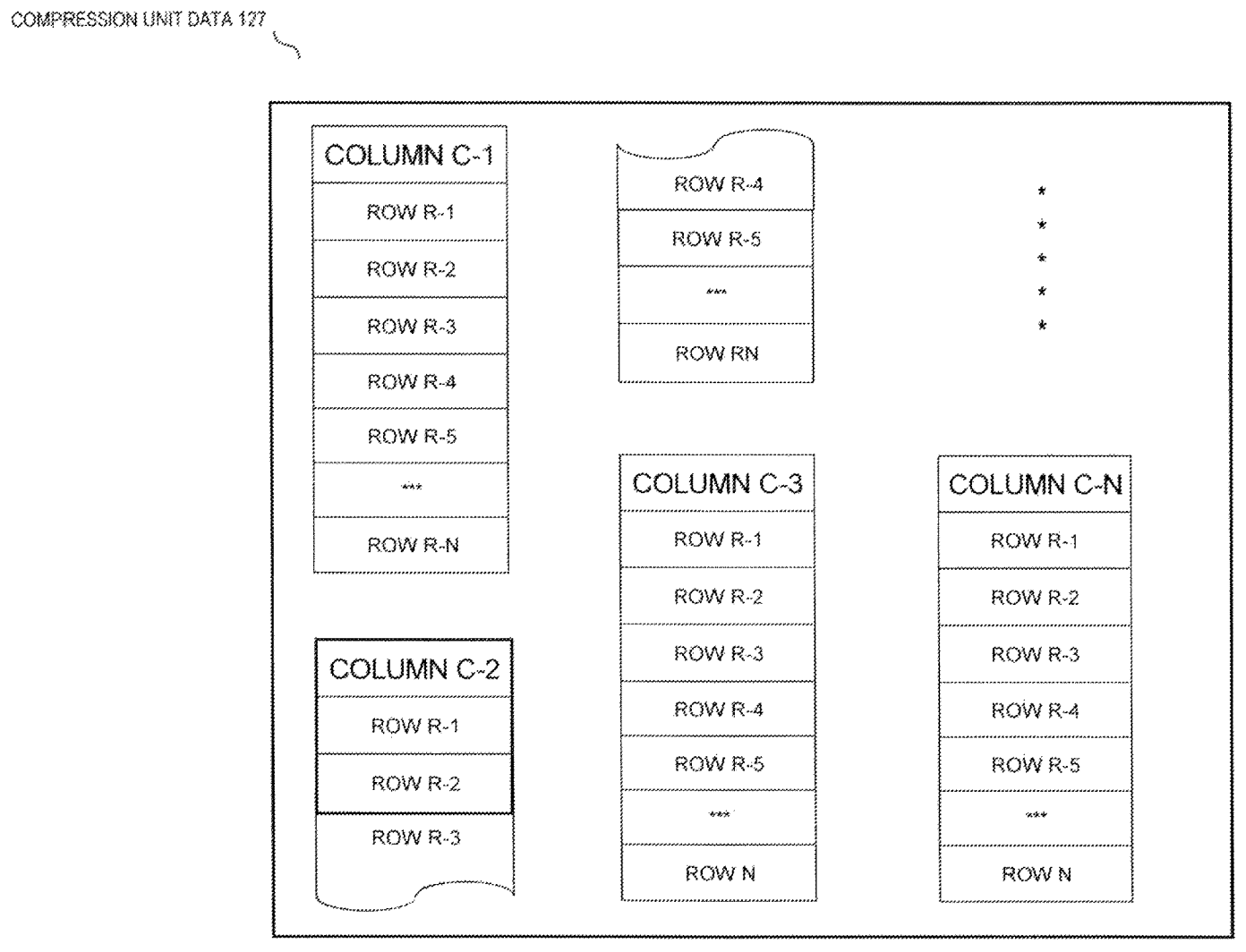

FIG. 1 depicts a base data block according to an embodiment of the present invention. Referring to FIG. 1, it depicts base data block 101, a base data block illustrative of base data blocks in an embodiment of the present invention. Base data block 101 contains data block header 102 and rows 110 of table T (not depicted). A data block header contains metadata describing properties of a data block (e.g. data block size, number of rows), and control data describing aspects of operations performed on the data block. Control data includes transaction list 103.

Transaction list 103 contains transaction list entries, each transaction list entry containing transaction information about a transaction that has, is, and/or will affect a row contained in base data block 101. According to an embodiment of the present invention, a transaction list entry includes a transaction identifier that identifies a transaction. An entry may also contain other information that, for example, indicates whether the transaction is active, committed, or aborted, and the commit time of the transaction if the transaction is marked as committed. A transaction remains listed and identified in a transaction list entry of transaction list 103 for at least as long as the transaction is active, that is, not committed or aborted.

Rows 110 include at least one column that holds one or more compression units. Each row of rows 110 contains a compression unit in compression unit column 111. Row 120 is illustrative of other rows in base rows 110.

Row 120 includes row header 121. A row header contains metadata describing properties of a row header's row (e.g. number of columns, row size), and control data describing aspects of operations performed on the row, such as identifying transactions affecting the row.

Row 110 also includes compression unit 125. A compression unit 125 includes compression unit header 126 and compression unit data 127. Compression unit data 127 contains rows stored in column-major format. A row stored in a compression unit may be referred to herein as a compression unit row.

Compression unit header 126 contains metadata describing properties of a compression unit. For example, a compression unit header includes metadata specifying the size of the compression unit, the number of rows in the compression unit, the number of and identity of columns in the compression unit, and compression techniques used to compress each column. Compression unit header 126 also includes control data describing and/or controlling aspects of operations performed on compression unit 125. For example, such control data may identify transactions affecting a compression unit row or which compression rows have been deleted.

FIG. 1A shows compression unit data 127 in greater detail. Compression unit data 127 contains columns C-1, C-2, C-3 through C-N of table T in column-major format. Each column comprises contiguously stored column values of row R-1 through R-N of table T. Column C-1 holds column values for column C-1 for row R-1, row R-2, row R-3, row R-4, and row R-5 through row R-N, respectively. Column C-2 holds respective column values for column C-2 for row R-1, row R-2, row R-3, row R-4, and row R-5 through row R-N, respectively. Column C-3 holds respective column values for column C-3 for row R-1, row R-2, row R-3, row R-4, and row R-5 through row R-N, respectively. Other base data blocks for table T may be similarly structured. Each of the columns in compression unit data 127 may be compressed according to same or different compression techniques selected for each of the columns.

As mentioned previously, columnar-major format facilitates compression by contiguously storing column values of a column. However, while compression reduces overhead by reducing storage needed to store data, there are other forms of overhead attendant to compressed data. For example, reading and evaluating compressed data entails the work of decompressing the data. In an embodiment of the present invention, a compression unit header is not compressed, to facilitate operations involving reading and evaluating data in a compression header.

Figure 2:
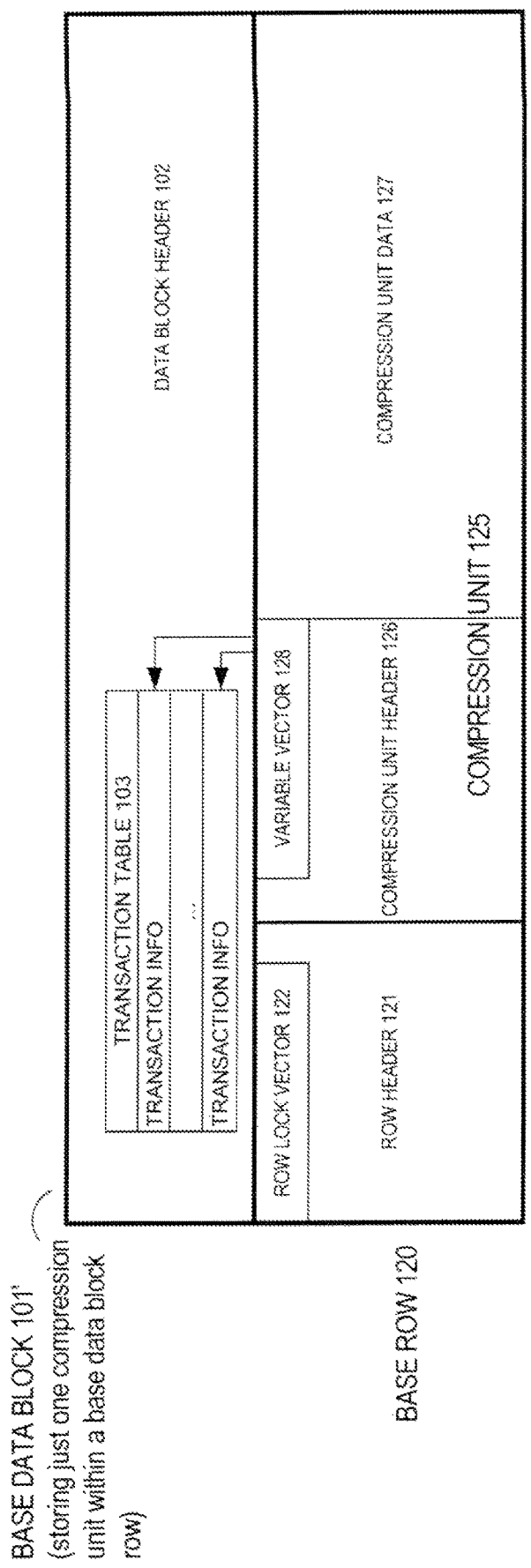
FIG. 2 is a diagram depicting a base data block containing a compression unit according to an embodiment of the present invention.

In an embodiment, a base data block typically includes only one compression unit, which is contained in a base row. Thus, much of a base data block is used to store a compression unit. FIG. 2 shows base data block 101 as base data block 101' storing just one compression unit, compression unit 125 in base row 120.

Compression Unit Level Locking

According to an embodiment of the present invention, a compression unit row may be locked at one of several levels of granularity, which include the "compression unit level" or the row level. For compression unit level locking, all compression unit rows in a compression unit are locked together as a unit by locking the base row that contains the compression unit. At row level locking, an individual compression unit row may be locked.

Compression unit level locking is achieved, at least in part, through the use of a row lock vector in a base row of a base data block, as is illustrated with row 120. Row 120 contains row lock vector 122 in row header 121. Row lock vector 122 is a sequence of bits. Distinct combinations of bit values each uniquely correspond to a transaction list entry in transaction list 103, or in other words, a value that can be represented by row lock vector 122 uniquely corresponds to a transaction list entry at a corresponding position in transaction list 103. The value 0001 corresponds to the first transaction list entry, which identifies transaction 301, in transaction list 103; the value 0010 corresponds to the second transaction list entry, which identifies transaction 302, in transaction list 103, and so forth.

To lock base row 120 for an active transaction, a transaction list entry in transaction list 103 is set to identify the active transaction, and row lock vector 122 is set to a value that identifies the transaction list entry identifying the active transaction. Locking base row 120 also locks all compression unit rows in compression unit 125.

Figure 3:
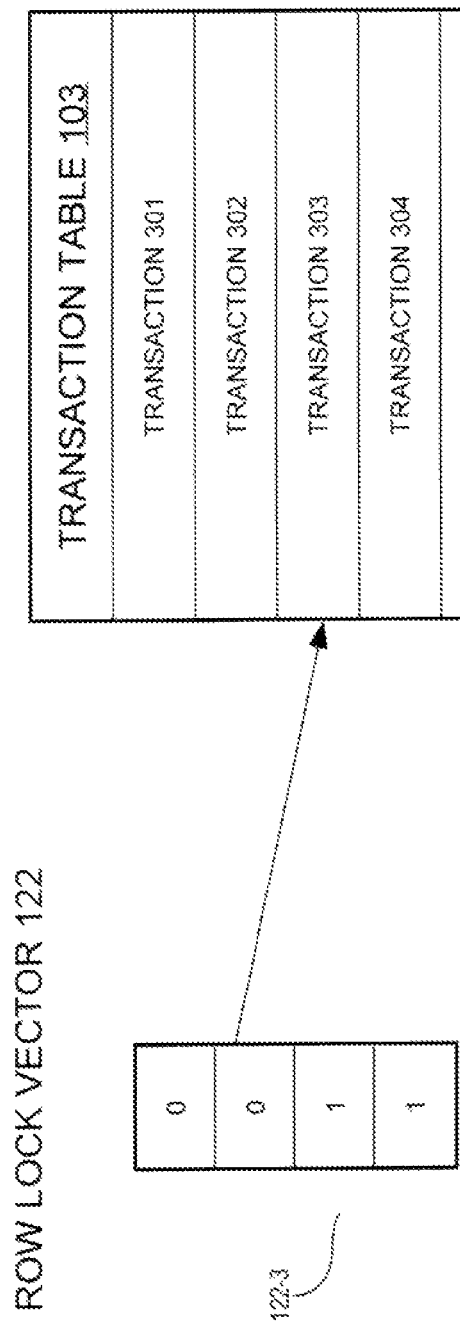
FIG. 3 is a diagram depicting a row lock vector according to an embodiment of the present invention.

FIG. 3 illustrates how row lock vector 122 and transaction list 103 are used to lock a base row 120, thereby locking the compression unit rows in compression unit 103 at the compression unit level. Referring to FIG. 3, it depicts transaction table 103 with seven transaction list entries. Row lock vector 122 comprises four bits, and is set to value 0011 to identify transaction 303 as owning a lock on base row 120, thereby establishing a lock on the compression unit rows for compression unit 125.

Locking Semantics and Terminology

Because the present invention involves locking, a discussion of the semantics of locking is useful. As the term is used herein, a lock grants to a process executing a transaction the right to access a unit of data in a particular way, units of data such as a row or set of rows in a compression unit. There are many types of locks. Some types of locks allow resources to be shared by many processes concurrently (e.g. shared read lock), while other types of locks prevent any type of lock from being granted on the same resource (exclusive write lock).

Once a transaction acquires a lock, the transaction holds or owns the lock until the lock is relinquished, revoked, or otherwise terminated. Locks are represented by data structures such as semaphores, read/write latches, condition variables, and as described herein, a lock vector or subvectors in combination with a corresponding transaction list. The state of the data structures is changed to grant or terminate locks, and the data structure may be examined to determine the particular status of a lock.

According to an embodiment, a lock is represented by a value in a lock vector that identifies a transaction. Setting the lock vector value from a state to another (e.g. from 00 to 10) to identify a transaction in a transaction list grants a lock on the transaction. Once granted, the transaction holds the lock (i.e. is a lock holder) until the lock is terminated. Setting the bit to the other state terminates the lock for the transaction.

Row Level Locking

As mentioned earlier, compression unit level locking can lead to a higher level of lock contention. Due at least in part to compression, a compression unit may contain many rows than if stored in another form, such as row-major format. Having more rows in a compression unit further exacerbates lock contention. According to an embodiment of the present invention, row level locking of compression unit rows in a compression unit is provided through the use of a variable lock vector. For each row in a compression unit in a base data block, the variable lock vector contains a row lock subvector that can be used to identifying a transaction in a transaction list that holds a lock of the row, if any. The number of bits in a vector, such as a row lock subvector or a variable lock vector, is referred to as the vector's size. Because there may be many rows in a compression unit and a corresponding number of row lock subvectors in a variable lock vector, the size of a row lock subvector greatly affects the size of the entire variable lock vector.

According to an embodiment of the present invention, the size of each row lock subvector in a variable lock vector is varied on an on-demand basis. As the number of active transactions that affect rows in a compression unit increase, and the need to concurrently identify more active transactions increases, the size of a row lock subvector is increased accordingly.

In an embodiment, a compression unit may not include any variable lock vector. A variable lock vector is created when needed to support locking by a transaction of a row in a compression unit. The size of a row lock subvector is increased when needed to support more active transactions.

Figure 4:
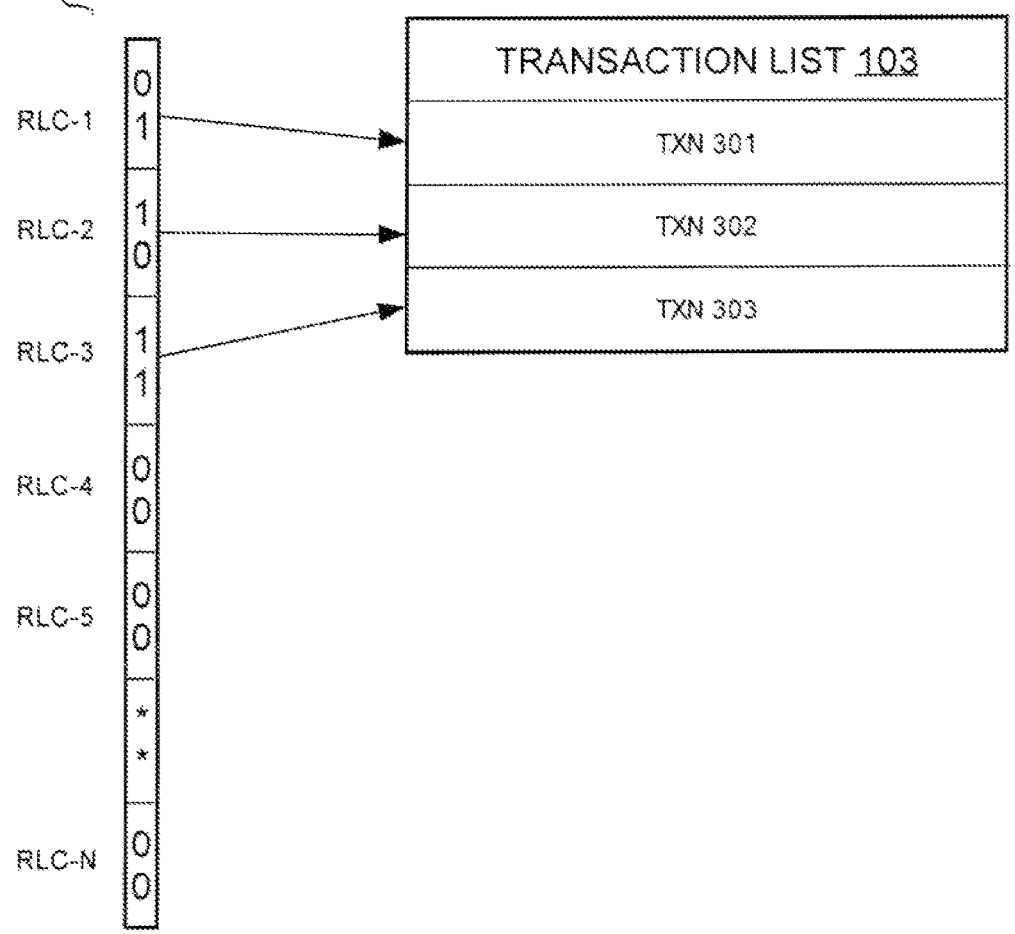
FIG. 4 is a diagram depicting a row lock vector according to an embodiment of the present invention.
Figure 5:
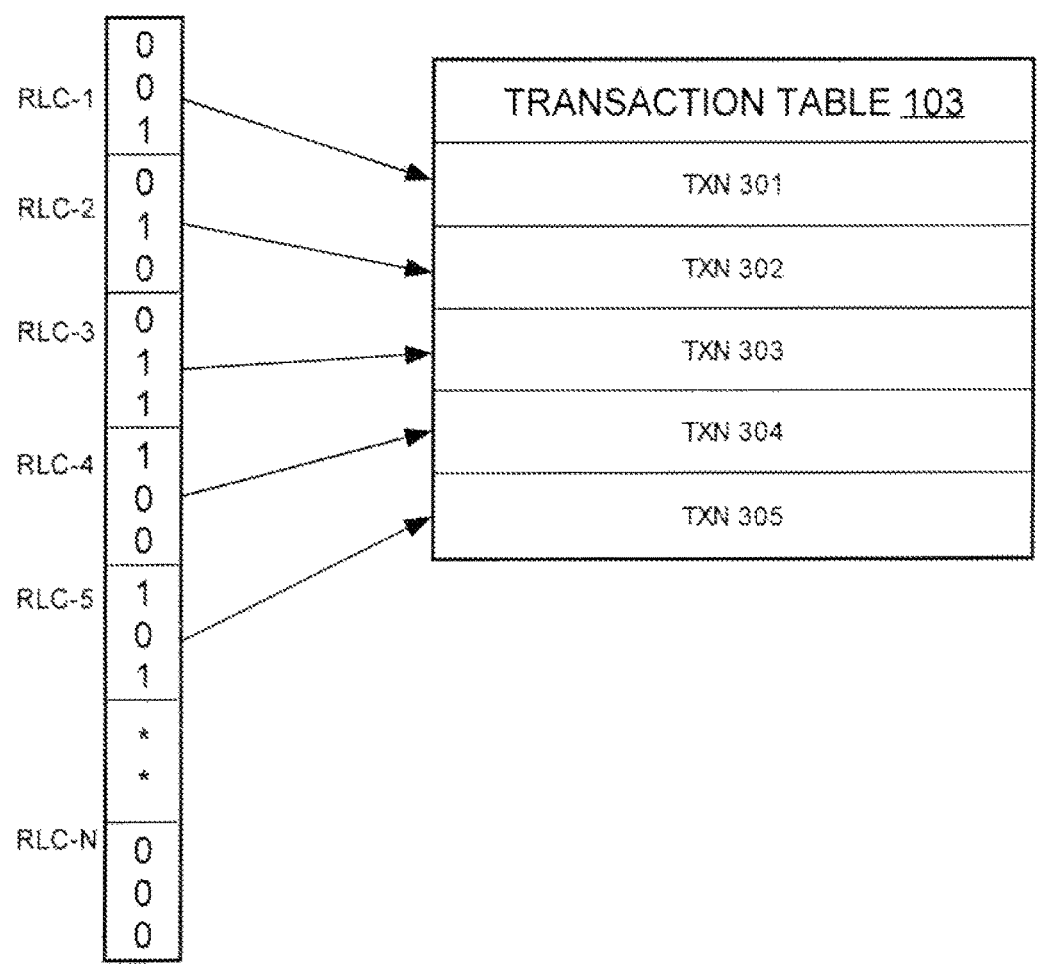
FIG. 5 is a diagram depicting a row lock vector according to an embodiment of the present invention.

FIG. 4 depicts a variable lock vector 128 comprising row lock subvectors having a size for a smaller number of transactions. FIG. 5 depicts variable lock vector 128 having a larger size for a larger number active transactions.

Referring to FIG. 4, it depicts variable lock vector 128, with a row lock subvector sized to identity three active transactions having locks on a separate compression unit row. Variable vector 128 includes row lock subvectors for the rows in compression unit data 127. Row lock vectors RLC-1, RLC-2, RLC-2, RLC-4, and RLC-5 through RLC-N are row lock vectors for rows R-1, R-2, R-3, R-4, R-5 through row R-N, respectively. The size of the row lock subvectors in variable lock vector 128 is 2, allowing enough bits in a row lock subvector to identify the three transactions listed in transaction list 103. Row lock subvector RLC-1, having a binary value 01, refers to the first entry in transaction list 103 identifying transaction 301. Row lock subvector RLC-2, having a binary value 10, refers to the second entry in transaction list 103 identifying transaction 302. Row lock subvector RLC-3, having a binary value 11, refers to the third entry transaction list 103 identifying transaction 303.

Referring to FIG. 5, it depicts variable lock vector 128, after having increased the size of row lock subvectors therein to identity more active transactions having a lock on compression unit rows in base data block 101. The size of the row lock subvectors in variable lock vector 128 is 3, allowing enough bits in a row lock subvector to identify the five transactions listed in transaction list 103. Row lock subvector RLC-1, having a binary value 001 refers to the first entry in transaction list 103 identifying transaction 301. Row lock subvector RLC-2, having a binary value 010, refers to the second entry in transaction list 103 identifying transaction 302. Row lock subvector RLC-3, having a binary value 011, refers to the third entry in transaction list 103 identifying transaction 303. Row lock subvector RLC-4, having a binary value 100, refers to the fourth entry in transaction list 103 identifying transaction 304. Row lock subvector RLC-5, having a binary value 101, refers to the fifth entry in transaction list 103 identifying transaction 305.

The size of a row lock subvector limits the number of transactions that can be concurrently identified by the row lock subvector, and hence the number of transactions that can concurrently hold a lock on one or more rows in a compression unit. The size of a row lock subvector in a compression unit associates the compression unit with a limit on the number of transactions that can concurrently hold a lock on one or more rows in the compression unit. A limit on the number of transactions that can concurrently hold a lock on one or more rows can also be dictated by the maximum number of entries a transaction list can accommodate.

Variable Lock Vector Expansion

Figure 6:
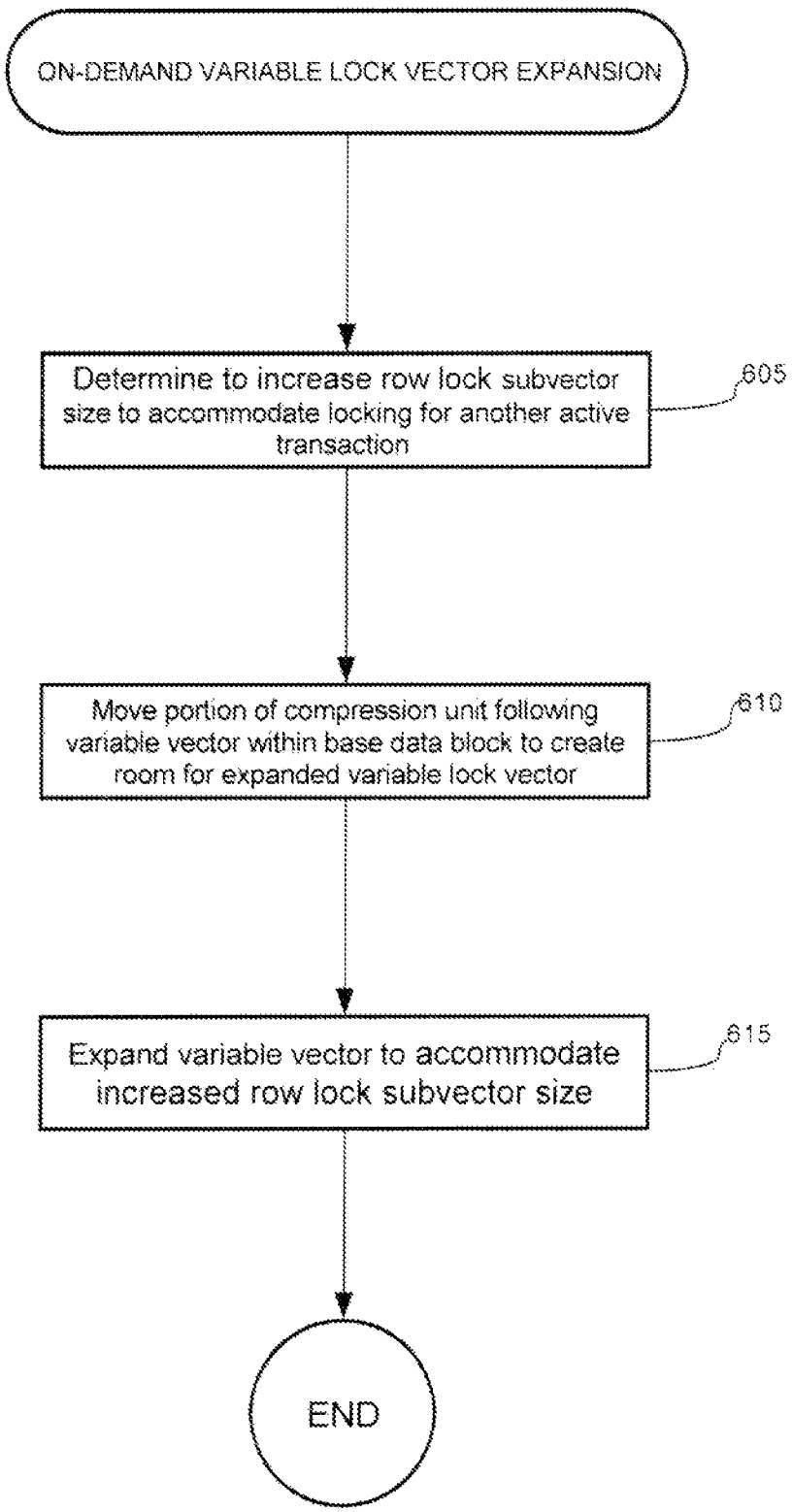
FIG. 6 is a diagram depicting a procedure for expanding a variable lock vector according to an embodiment of the present invention.

FIG. 6 depicts a procedure for expanding the variable lock vector to increase the size of the row lock subvectors contained therein. According to an embodiment, the variable lock vector is expanded when a database transaction updates, inserts, or deletes a row in a compression unit, and a row lock subvector with greater size is needed to identify the transaction in addition to other active transactions listed in the transaction list of the base data block containing the compression unit. The procedure for variable lock vector expansion is illustrated using base data block 101 and a database server (not depicted in figures). For purposes of illustration, the row lock subvector size of variable lock vector 128 is 2, as depicted in FIG. 4. There are active transactions for base data block 101, which are transactions 301, 302, and 303, as listed in transaction list 103 in FIG. 4. Transaction 304 updates row R-4 in table T. In the following procedure, the changes made to the data block to expand the variable lock vector 128 are part of transaction 304.

Referring to FIG. 6, at step 605, the database server determines that the row lock subvector size of variable lock vector 128 should be increased to accommodate a lock for an active transaction affecting a row in compression unit 125. In the current illustration, transaction 304 is added to transaction list 103. The current size of row lock subvector is 2 and should be expanded to 3 to identify a fourth transaction within transaction list 103, which is transaction 304.

At step 610, in response to determining to expand the row lock subvector size in step 610, the database server moves or shifts compression unit 125 to make storage space within base data block 101 for expanding variable lock vector 128.

At step 615, variable lock vector 128 is expanded so that the row lock subvector size therein is 3, as depicted in FIG. 5, instead of 2. Variable vector 128 is expanded to fill the space created by moving compression unit 125 in step 610.

According to an embodiment, the changes made to the data block to expand variable lock vector 128 are made in a recursive transaction. In response to determining to expand the row lock subvector, the database server initiates a recursive transaction to change a data block for variable vector expansion. The recursive transaction is executed and committed independently of the transaction that causes the need for variable vector expansion, which in the case of the current illustration is transaction 304. Furthermore, row level locking is used for transactions that not only update rows but insert or delete rows; variable lock vector expansion is performed to execute such transactions in a manner similar to that described above.

Shrinking the Variable Vectors

Eventually, active transactions terminate. Thus, after expanding variable lock vectors of a compression unit, the increased size may no longer be needed to identify active transactions for a data block. To reclaim storage space, the variable lock vectors in the base data blocks may be shrunk, that is, the row lock subvector size reduced. In fact, the variable lock vectors may be eliminated from compression units. Operations for shrinking the size of variable lock vectors or eliminating the variable lock vectors from data blocks is referred to herein as variable lock vector reduction.

According to an embodiment of the present invention, variable lock vector reduction is performed lazily, that is, variable lock vector reduction is performed in a transaction subsequent to a transaction that expanded the variable lock vector. For example, in executing a transaction subsequent to transaction 304 that updates a row in the compression unit 125, the database server determines that it is the only active transaction affecting compression unit 125, and the size of the row lock subvector in variable lock vector 128 is 3, a size greater than needed to identify one transaction. In response to this determination, the database server determines to reduce the size of the row lock subvector in variable lock vector 128, thereby reducing the size of variable lock vector 128. Reducing the size includes shifting over compression unit 125 to occupy space freed by switching to a smaller variable lock vector.

According to an embodiment of the present invention, row level locking may be enabled or disabled for a data object by issuing a DDL command referencing the database object and specifying whether row level locking is enabled or disabled. In response to a DDL command referencing a database object that specifies to enable row level locking, variable lock vectors may be expanded or reduced as described above. In addition, a DDL command may specify a minimum row lock subvector size for the database object. A database object includes not only a table, but table partitions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
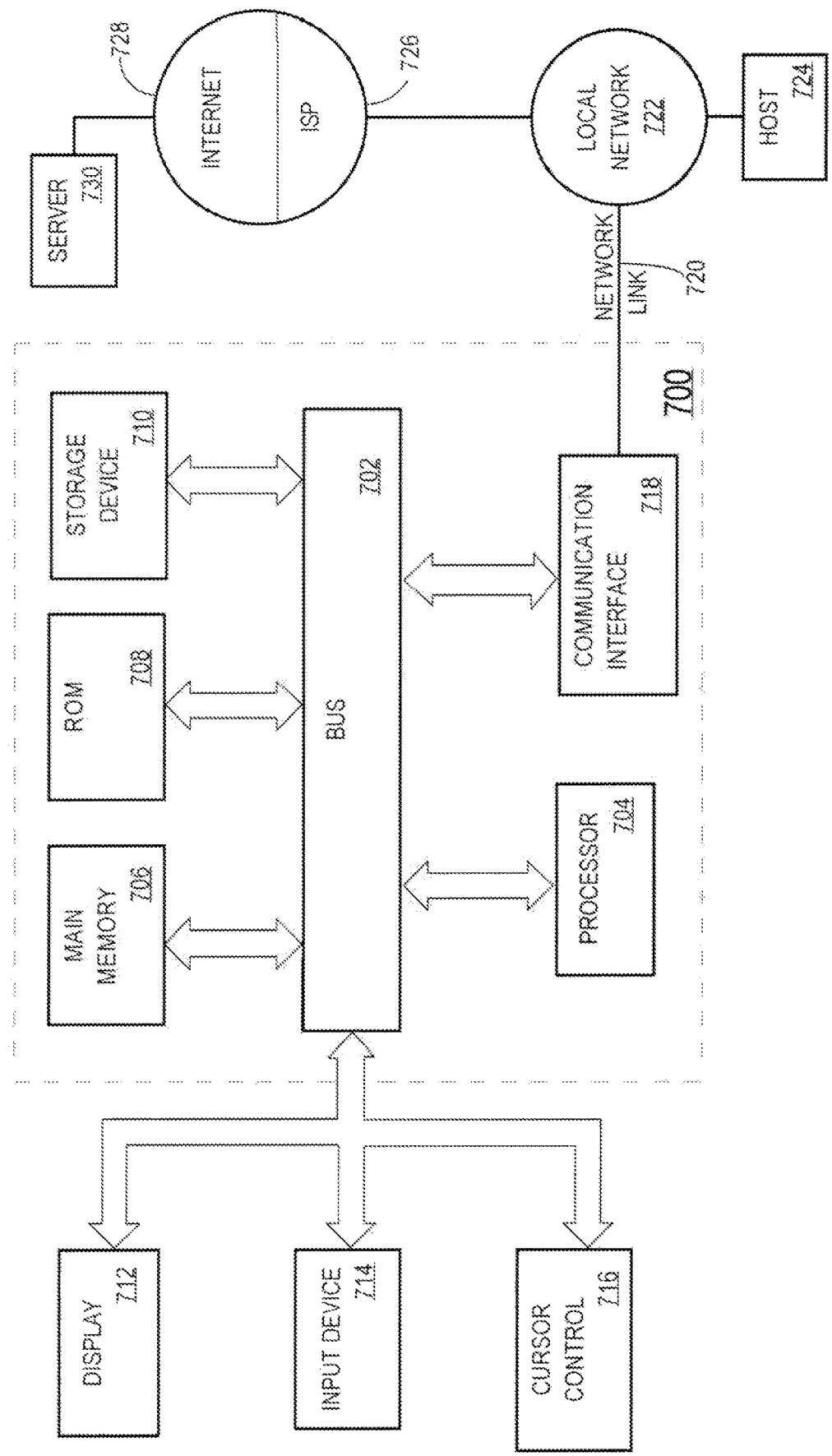
FIG. 7 is a diagram depicting a computer system that may be used in an embodiment of the present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising steps of:
storing a respective plurality of rows in column-major format in each data block of a plurality of data blocks, wherein each data block of said plurality of data blocks includes a respective lock vector that specifies whether each row of the respective plurality of rows of said each data block is locked; and
at a row-level of granularity, locking a subset of the respective plurality of rows of a particular data block of said plurality of data blocks, wherein locking the respective plurality of rows of said particular data block includes:
a first transaction obtaining a lock on a first row having at least one column value of a column in said particular data block, wherein said first transaction obtaining a lock includes modify the respective lock vector of said particular data block to indicate said first row is locked; and
while said first transaction holds said lock on said first row, a second transaction obtaining a lock on a second row having at least one column value of said column in said particular data block, wherein said second transaction obtaining a lock includes modify said respective lock vector of said particular data block to indicate said second row is locked.

2. The method of claim 1, wherein each data block of said plurality of data blocks contains a compression unit that contains the respective plurality of rows of said each data block, wherein a compression unit contained in said particular data block contains said first row and said second row.

3. The method of claim 1, wherein each data block of said plurality of data blocks is associated with a limit on a number of transactions that can concurrently hold a lock on a row in said each data block, wherein the limit associated with a first data block of said plurality of data blocks is different than a limit associated with a second data block of said plurality of data blocks.

4. The method of claim 3, further including: for another data block of said plurality of data blocks, increasing the limit associated with said another data block.

5. The method of claim 1, while said first transaction holds said lock on said first row, locking multiple rows of another data block of said plurality of data blocks at a level of granularity higher than said row level of granularity.

6. A method comprising steps of:
storing a plurality of rows in a plurality of data blocks in column-major format, wherein each data block of said plurality of data blocks includes a variable lock vector that is used to identify one or more transactions having a lock on a row in said each data block; and
locking a plurality of rows at a row-level of granularity within a particular data block of said plurality of data blocks, said particular data block containing a particular variable lock vector, wherein locking said plurality of rows at a row-level of granularity includes:
setting a first sequence of bits in said variable lock vector to a first value to lock a first row in said particular data block for a first transaction; and
while said first transaction holds said lock on said first row:
setting a second sequence of bits in said variable lock vector to a second value to lock a second row in said data block for a second transaction; and increasing a size of the variable lock vector in said particular data block to lock a third row in said particular data block for a third transaction.

7. The method of claim 6, wherein each data block of said plurality of data blocks contains a compression unit that contains a subset of said plurality of rows, wherein said particular data block contains said first row and said second row.

8. The method of claim 6, after increasing the size of said variable lock vector in said particular data block, decreasing the size of said variable lock vector in said particular data block.

9. The method of claim 6, receiving one or more database commands that indicate a minimum size of a variable lock vector.

10. One or more non-transitory storage media storing instructions, which, when executed by one or more computing devices, cause:
storing a respective plurality of rows in column-major format in each data block of a plurality of data blocks, wherein each data block of said plurality of data blocks includes a respective lock vector that specifies whether each row of the respective plurality of rows of said each data block is locked; and
at a row-level of granularity, locking a subset of the respective plurality of rows of a particular data block of said plurality of data blocks, wherein locking the respective plurality of rows of said particular data block includes:
a first transaction obtaining a lock on a first row having at least one column value of a column in said particular data block, wherein said first transaction obtaining a lock includes modify the respective lock vector of said particular data block to indicate said first row is locked; and
while said first transaction holds said lock on said first row, a second transaction obtaining a lock on a second row having at least one column value of said column in said particular data block, wherein said second transaction obtaining a lock includes modify said respective lock vector of said particular data block to indicate said second row is locked.

11. The one or more non-transitory storage media of claim 10, wherein each data block of said plurality of data blocks contains a compression unit that contains the respective plurality of rows of said each data block, wherein a compression unit contained in said particular data block contains said first row and said second row.

12. The one or more non-transitory storage media of claim 10, wherein each data block of said plurality of data blocks is associated with a limit on a number of transactions that can concurrently hold a lock on a row in said each data block, wherein the limit associated with a first data block of said plurality of data blocks is different than a limit associated with a second data block of said plurality of data blocks.

13. The one or more non-transitory storage media of claim 12, the instructions further including instructions that when executed by said one or more computing devices, cause, for another data block of said plurality of data blocks, increasing the limit associated with said another data block.

14. The one or more non-transitory storage media of claim 10, the instructions further including instructions that when executed by said one or more computing devices, cause, while said first transaction holds said lock on said first row, locking multiple rows of another data block of said plurality of data blocks at a level of granularity higher than said row level of granularity.

15. One or more non-transitory storage media storing instructions, which, when executed by one or more computing devices, cause:
storing a plurality of rows in a plurality of data blocks in column-major format, wherein each data block of said plurality of data blocks includes a variable lock vector that is used to identify one or more transactions having a lock on a row in said each data block; and
locking a plurality of rows at a row-level of granularity within a particular data block of said plurality of data blocks, said particular data block containing a particular variable lock vector, wherein locking said plurality of rows at a row-level of granularity includes:
setting a first sequence of bits in said variable lock vector to a first value to lock a first row in said particular data block for a first transaction; and
while said first transaction holds said lock on said first row:
setting a second sequence of bits in said variable lock vector to a second value to lock a second row in said data block for a second transaction; and
increasing a size of the variable lock vector in said particular data block to lock a third row in said particular data block for a third transaction.

16. The one or more non-transitory storage media of claim 15, wherein each data block of said plurality of data blocks contains a compression unit that contains a subset of said plurality of rows, wherein said particular data block contains said first row and said second row.

17. The one or more non-transitory storage media of claim 15, the instructions further including instructions that when executed by said one or more computing devices, cause, after increasing the size of said variable lock vector in said particular data block, decreasing the size of said variable lock vector in said particular data block.

18. The one or more non-transitory storage media of claim 15, the instructions further including instructions that, when executed by said one or more computing devices, cause, receiving one or more database commands that indicate a minimum size of a variable lock vector.

* * * * *